(12) United States Patent
Groveman et al.

(10) Patent No.: US 7,103,569 B1
(45) Date of Patent: Sep. 5, 2006

(54) ACTIVE ACCOUNT MANAGEMENT USING VOLATILITY ARBITRAGE

(76) Inventors: Lloyd A. Groveman, 4 Park Drive East, Old Westbury, NY (US) 11568; Richard L. Zack, 10 Rotary Dr., Summit, NJ (US) 07901

( * ) Notice: Subject to any disclaimer, the term of this patent is extended or adjusted under 35 U.S.C. 154(b) by 0 days.

(21) Appl. No.: 09/537,372

(22) Filed: Mar. 24, 2000

(51) Int. Cl.
*G06Q 40/00* (2006.01)

(52) U.S. Cl. ............................. 705/35; 705/36; 705/37

(58) Field of Classification Search ............ 705/35–37, 705/1; 364/408
See application file for complete search history.

(56) References Cited

U.S. PATENT DOCUMENTS

| | | | | |
|---|---|---|---|---|
| 5,557,517 | A | * | 9/1996 | Daughterty, III .............. 705/37 |
| 5,799,287 | A | * | 8/1998 | Dembo .......................... 705/36 |
| 5,819,238 | A | * | 10/1998 | Fernholz ....................... 705/36 |
| 5,884,286 | A | * | 3/1999 | Daughtery, III ............. 705/36 |
| 5,946,667 | A | * | 8/1999 | Tull et al. ..................... 705/36 |
| 6,061,662 | A | * | 5/2000 | Makivic ....................... 705/36 |
| 6,064,985 | A | * | 5/2000 | Anderson .................... 705/36 |
| 6,263,321 | B1 | * | 7/2001 | Daughtery, III ............. 705/36 |
| 6,418,419 | B1 | * | 7/2002 | Nieboer et al. .............. 705/37 |

OTHER PUBLICATIONS

Kolb, Robert W., Futures, Options, & Swaps, Blackwell Business, 3rd Ed., Preface, Chapters 1, 4, 7, 8, 10, 11.*
Kolb, Robert W., Financial Derivatives, Blackwell Business, 2nd Ed.*
Don M. Chance, An Introduction to Derivatives, 1998, The Dryden Press, Hartcourt Brace College Publishers, 4th Ed., pp. 31-32, 572, 670-672, 722, 356-358, 756, 761.*

* cited by examiner

*Primary Examiner*—Jeffrey Pwu
*Assistant Examiner*—Siegfried E. Chencinski
(74) *Attorney, Agent, or Firm*—Darby & Darby (57) ABSTRACT

Software and methodology for active account management using volatility arbitrage is described. The software and method of the invention identify differences between the volatility of an index and the volatilities of the constituents of that index, that is, the dispersion, and harvests or extracts those differences in the form of premiums. A method comprises establishing tracking baskets populated with component equities which satisfy prescribed criteria, such as possessing a high degree of correlation to the underlying index, a predetermined volatility differential relative to the underlying index, or both. The tracking basket is then dynamically hedged using options. In another aspect of the invention, methods and software are provided for the selection of options to dynamically hedge the trading basket.

25 Claims, 4 Drawing Sheets

ACTIVE ACCOUNT MANAGEMENT USING VOLATILITY ARBITRAGE

FIELD OF THE INVENTION

The present invention relates to money management techniques and more particularly to a method for actively managing a basket of equities through volatility arbitrage and harvesting.

BACKGROUND OF THE INVENTION

A common goal in the financial sector is to manage funds in a manner which maximizes upside potential for profit while minimizing the risk of loss of principal. In this regard, index and equity options have been traded as insurance against loss and as a way of reducing one's cost basis. There are many strategies known in the art of options trading including hedges, straddles and collars. A limitation of these strategies has been the prohibitively expensive cost of buying put options to fully hedge an investment from one period to another. Accordingly, a compromise strategy is often taken in which either (i) less than a completely hedged position is taken, thereby exposing the account to downside risk or alternatively, (ii) an investor may opt to forgo some amount of appreciation in the underlying stock position to fund such protection. In either case, hedging strategies utilizing options and other market-neutral philosophies have generally been inefficient from a federal income tax perspective.

What is needed in the art and has heretofore not been available is an effective downside hedging methodology, with the opportunity to maximize upside participation in a tax efficient manner. The present invention provides such benefits and others, and where applicable is effected in a tax efficient manner.

SUMMARY OF THE INVENTION

The objective of the strategy is to generate attractive risk-adjusted returns, while utilizing relatively low levels of leverage. The strategy is designed to significantly enhance the risk/reward profile of investing in the broader equity market or a particular sector of the market and offers the potential for profit in both rising and falling markets. The strategy can be designed to maximize after-tax returns, if that is a desired criterion.

The invention is based upon a volatility arbitrage and harvesting methodology. Volatility arbitrage and harvesting concerns the identification of differences between the volatility of an index and the volatilities of the constituents of that index, that is, the dispersion, and harvests or extracts those differences in the form of premiums. The invention provides investors with a benefit by establishing tracking baskets populated with component equities having a volatility which is different from the volatility of the index. Volatility harvesting and extraction refers to the ability to take advantage of the differences between historical and implied volatility on a particular security.

In accordance with one aspect of the invention, a method for actively managing an account through volatility arbitrage and harvesting is described. In this method, a tracking basket which contains a plurality of equities is established, with each equity being included in an underlying index and, in the aggregate, the components possessing a high degree of correlation to the underlying index, a predetermined volatility differential relative to the underlying index, or both. Once established, the tracking basket is dynamically hedged using options.

In a further aspect of the invention, a programmed computer can execute an optimization routine against at least one constraint in connection with the establishment of the tracking basket. The establishing step can include a regression analysis which results in a tracking basket that achieves an $r^2$ value, relative to the underlying index, above a value.

The tracking basket is preferably hedged by buying put options on the underlying index in an amount sufficient to cover the notional amount of the tracking basket. Such puts are preferably fully funded by selling a selection of options on at least a portion of the equities in the tracking basket. The hedge is preferably established so as to minimize or maintain below a threshold value the net delta of the tracking basket and the selection of options.

The selection of which options to purchase and sell is preferably made with the assistance of a software program.

In accordance with another aspect of the present invention, a software program contained on a computer-readable medium is described. The software program, when executed within a digital computer, causes the computer to access current price information on a designated underlying index, and each of the equities in a tracking basket established in accordance with prescribed criteria. A skew analysis is then performed on at least a portion of the equities in the tracking basket over one or more maturity periods to identify a first set of options each commanding a premium. A second set of options is identified of which each has a relative implied volatility which is greater than its historical volatility in a given maturity period. The software program strikes a balance between the implied volatility percentage from the options in the first set against the relative implied volatilities of the options in the second set to thereby identify a selection of options to sell. Then, one or more put options are identified which, together with the selection of options to sell, results in a net delta of a portfolio (including the tracking basket, the selection of options to sell, and the identified put options) being below a threshold value. The selection of options to sell and the identified put options are then displayed on a monitor connected to the computer such that the software program automatically identifies a generally risk neutral portfolio.

These and other aspects, acts, and features of the present invention can be further appreciated from the accompanying Drawings and Detailed Description of a Preferred Embodiment.

DETAILED DESCRIPTION OF A PREFERRED EMBODIMENT

By way of overview and introduction, the present invention is described in connection with an account which is actively managed in an automated system under the control of a fund manager. The account includes a portfolio of equities which define a tracking basket in which each of the basket's components has prescribed characteristics such that the tracking basket generally has a relatively high degree of correlation to a particular underlying index. Premiums are collected by selling call options against all or a portion of the equities in the portfolio and selling put options against the underlying index and/or against underlying securities which may be part of the tracking basket but, if not, still exhibit the requisite attributes to be included in such tracking basket (collectively, the "short options"). The collected premiums are spent in buying put options on the underlying index.

In accordance with the preferred embodiment of the invention, the volatility of the underlying index for which the puts are purchased is less than that of the securities underlying the short options. This is achievable, for example, by purchasing puts on highly covariant instruments such as indices and selling calls on individual equities which are comparatively highly volatile and therefore command a large premium. Through dynamic hedging of the tracking basket, the downside risk in the portfolio is minimized while the upside potential is optimized. Although the invention is described in connection with an automated system, the invention can be implemented by an experienced trader.

Figure 1:
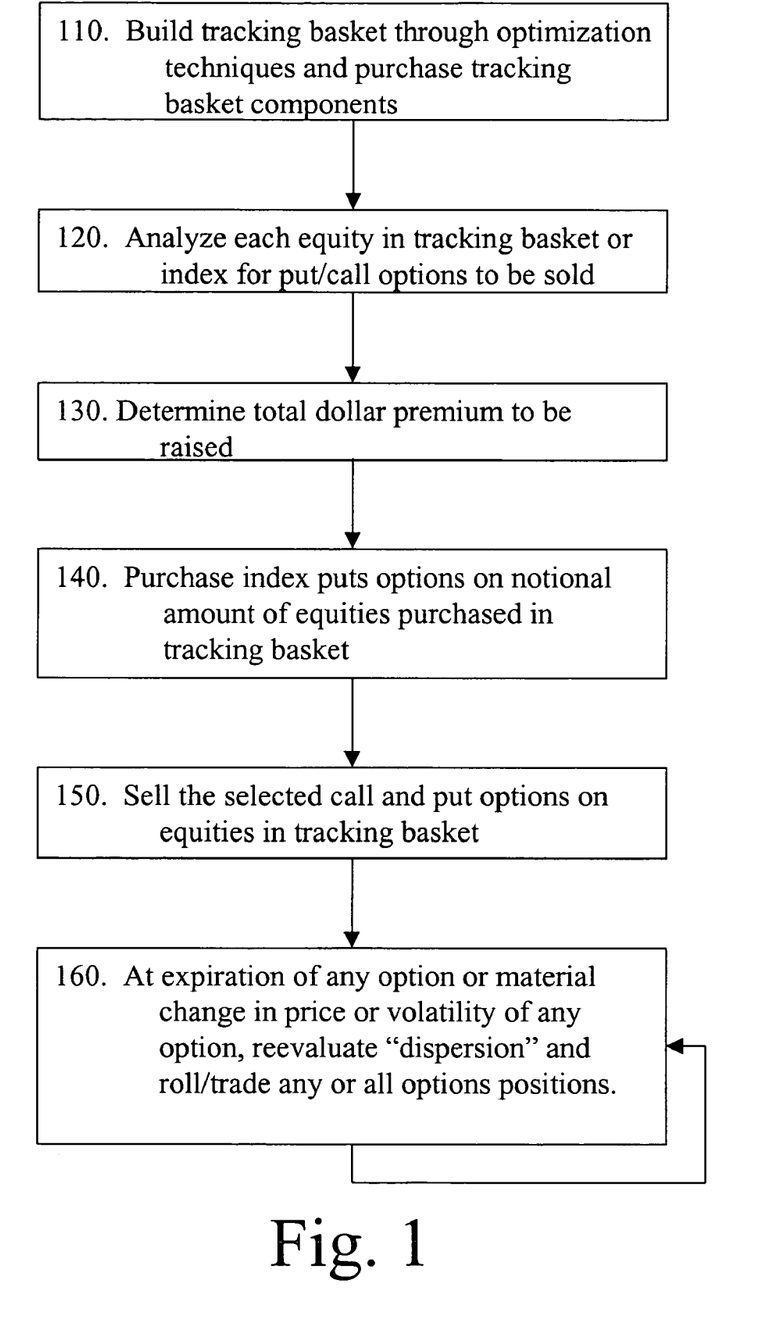
FIG. 1 illustrates an overall process of a preferred method for actively managing an account in accordance with the present invention.

With reference now to FIG. 1, a tracking basket of equities is selected using optimization techniques to ensure that the selected stocks (both identity and quantity) satisfy prescribed criteria, as shown at step 110. Each of the equities in the tracking basket (or included in the index) is analyzed at step 120 to determine the best candidates against which puts or calls can be sold. At step 130, the total dollar premium that will be raised by selling puts and calls is determined. A significant portion of this total dollar premium is used to purchase a put on the underlying index in an amount sufficient to cover the notional amount of the equities in the tracking basket. The notional amount refers to the total value of the tracking basket and, if any puts have been sold, also includes for all puts sold the sum of the puts' strike price times its quantity times 100, the ordinary contract multiplier for an options contract. The long puts on the underlying index is referred to herein as a "basket hedge," the number of such puts that are being purchased is a function of the notional value of the tracking basket, and the strike price of the puts being purchased is selected in view of the total dollar premium to be raised as well as risk tolerance of the selected portfolio strategy. The number of put options times their respective strike prices that comprise the basket hedge is preferably made equal to the notional value of the tracking basket, at step 140. Once the basket hedge is in place, the call and put options that were selected at step 120 are sold at step 150 to raise the premium required to cover and/or exceed the cost of the basket hedge from step 140. From time-to-time, as shown at step 160, the dispersion of the tracking basket is re-assessed using the optimization techniques of step 110 and the outstanding short and long options are either rolled or traded or permitted to expire, in accordance with predetermined criteria. For example, the predetermined criteria can include the expiration of any of the selected call/put options, any material change in the price of an equity in the tracking basket or in the price of the underlying index, any change in volatility of any equity or option, or a combination thereof. Such re-assessments of the dispersion characteristics of the tracking basket can result in the tracking basket 110 being rebuilt; however, the overall steps of the invention proceed as outlined above until such time that the tracking basket is liquidated.

Figure 2:
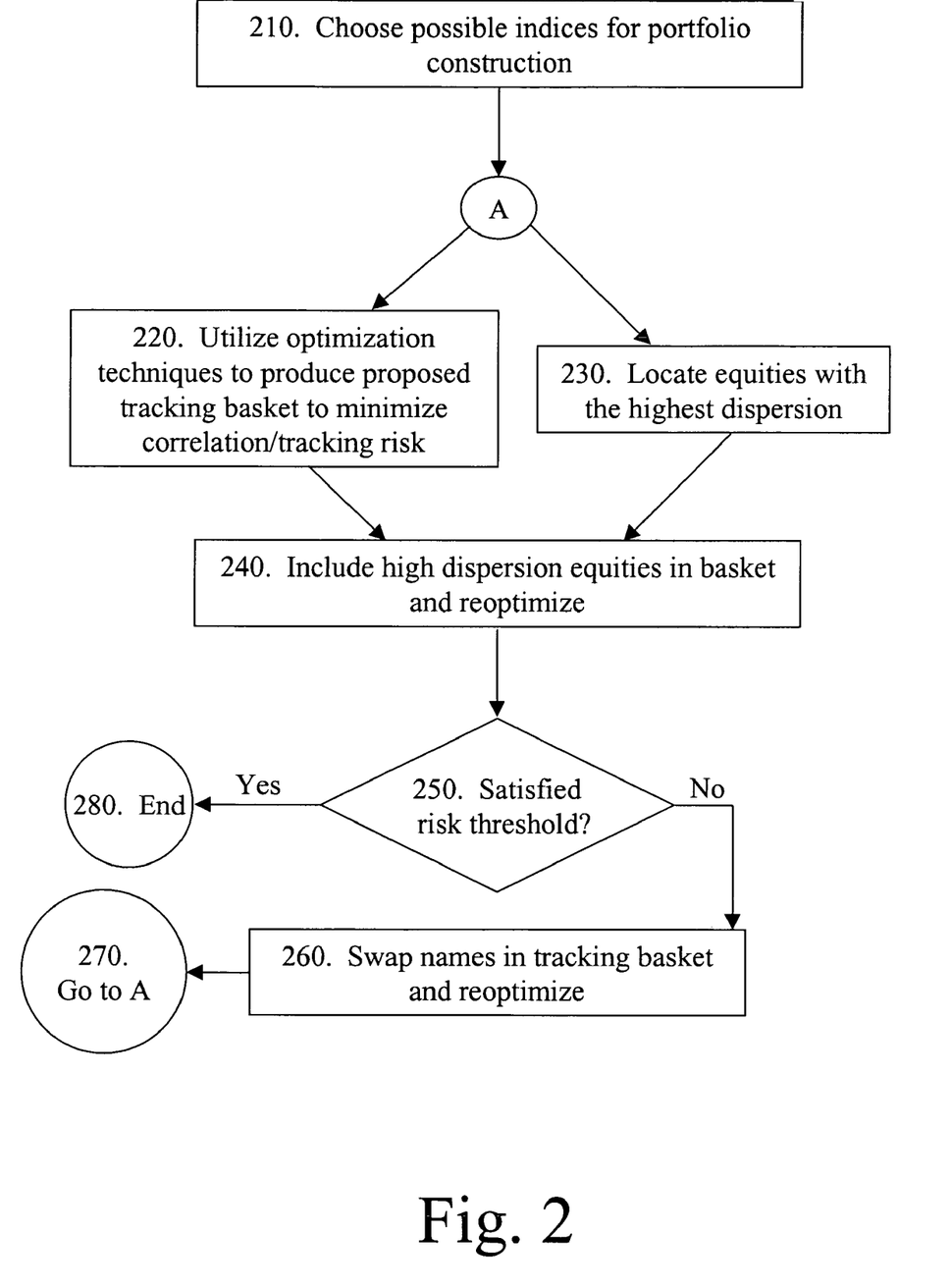
FIG. 2 illustrates a process for constructing a tracking basket in accordance with the process of FIG. 1.

With reference now to FIG. 2, the tracking basket and the manner of selecting the underlying equities to be included in the basket is described.

At step 210, an index is arbitrarily selected as the basis for the tracking basket to be constructed. A variety of indices are available which are publically traded and have options associated with them. By way of example only, any of the following indices is suitable as the benchmark index for constructing the tracking basket: S&P 500 (Symbol SPX), the S&P 100 (Symbol OEX), the NASDAQ 100 (Symbol NDX), the Morgan Stanley High Technology Index, (Symbol MSH), and The Street.Com/Philadelphia Internet Index (Symbol DOT).

The tracking basket includes a portfolio or group of equities which are selected based upon prescribed characteristics relative to the chosen benchmark or underlying index. The components of the tracking basket must be contained in the benchmark index or indices. Together, the equities in the tracking basket preferably possess the following characteristics:

1. A high degree of correlation to the underlying index
2. A predetermined or minimum volatility difference relative to the underlying index A portfolio of components which exhibits a "high degree of correlation" to the index itself is discerned using a conventional linear optimization routine, at step 220. Such a routine requires a constraint against which differences can be minimized.

Preferably, the constraint against which the tracking components are selected is to preserve favorable federal tax treatment. It is desirable that the component securities in the tracking basket be less than a predetermined percentage of the underlying index that is being hedged, for example, 70%. Such a tracking basket possesses the characteristic that it is not "substantially identical" to the underlying index, as that term is used by the United States Department of the Treasury. The linear optimization routine can be run against this constraint to result in a proposed tracking basket consisting of quantities of several different securities which are close to, say, 70% of the benchmark index. These stocks are more likely to track the index than a basket consisting of only 40% of the index, for example.

However, a constraint to preserve favorable federal tax treatment is not necessary for non-taxable U.S. investors (e.g. institutions) and non-U.S. investors. An alternative constraint that can be used to optimize the component selection of a proposed tracking basket in the first instance is the volatility of the component relative to the underlying index, a parameter discussed further hereinbelow. Another alternative is to constrain the selection to a predetermined number of equities to have in the tracking basket.

Preferably, the optimization routine identifies those components within the benchmark index which most closely reside on the curve of the historical price graph of the benchmark index itself. This type of routine is required, for example, when evaluating an equal-dollar weighted index. For indices that use other weighting factors such as market capitalization, a high degree of correlation often can be found from among the largest market capitalization components in the index, and those components are more likely to be included in the selected tracking basket. Thus, in the case of a market-capitalization weighted index, if the proposed components of the tracking basket are among the larger market capitalization equities, then suitable components for the tracking basket which have a high degree of correlation generally can be identified without the use of a linear optimization routine.

The optimization routine performed in the preferred embodiment is a routine executing on a programmed computer which has access (e.g., a data link or feed) to the current price of the components and the index as well as their respective historical volatilities.

In accordance with a salient aspect of the invention, a final selection of tracking basket components is made with regard to the volatility difference or "dispersion" that a proposed tracking basket component has relative to the underlying index. (As noted above, this parameter can be used in the initial tracking basket component selection process in accordance with other embodiments of the invention.) Dispersion is the difference between the volatility of a tracking basket component and the volatility of the index, where "volatility" is the annualized standard deviation of the log-normal daily differences in stock prices. In general, a low volatility will command a smaller premium when selling an option and so less sums are garnered. On the other hand, equities that are highly volatile will command a great premium and be a fertile source of funds for purchasing puts to dynamically hedge the tracking basket. The fund manager must strike a balance between the desirability of collecting large premiums and the need for a balanced tracking basket by selecting a predetermined or minimum volatility differential. Such a balance can be represented by an entry in a knowledge base which supplies information to a rule base in an artificially intelligent, automated system programmed to implement this embodiment of the invention. The knowledge base contains criteria consistent with the trading strategy chosen by the fund manager.

At step 230, the components of the benchmark index having the greatest dispersion are located. This step can be accomplished by sorting the components on the basis of their dispersion, and can be done automatically in a programmed computer. Equivalently, step 230, and any sorting, can be done on the basis of absolute volatility. For example, the Standard & Poors 500 (S&P 500) is a long-established index which has an historical volatility in the 20s whereas the stock of Microsoft Corporation, one of the components of the S&P 500, has an historical volatility in the 30s to 40s. The dispersion between the two might make the Microsoft stock a suitable candidate for the tracking basket. At step 240, one or more of the high volatility (equivalently, high dispersion) equities is included in the proposed tracking basket, and the linear optimizer is constrained, in addition to a basic constraint (e.g., less than a predetermined percentage of the benchmark index as in the preferred embodiment), with a further constraint to not remove those high volatility components.

The substitution of a high volatility equity into the initial proposed tracking basket, and the concomitant adjustments in the number of shares of each equity to purchase, tends to upset the ability of the tracking basket to track the benchmark index. Accordingly the substitution preferably results in a proposed basket which through regression analysis, maximizes the $r^2$ value relative to the benchmark index and achieves an $r^2$ value above a predetermined value such as 0.8 and more preferably above 0.9.

The "$r^2$" used herein refers to a measurement of how closely a portfolio's performance correlates with the performance of the underlying or benchmark index, such as one of the indices referred to above. Thus, $r^2$ is a measurement of what portion of the portfolio's performance can be explained by the performance of the overall market or index. Ranges from 0 to 1 can be used, for example, where 0 indicates no correlation and 1 indicates perfect correlation.

The computed $r^2$ value is compared at step 250 against a prescribed threshold value and the $r^2$ value satisfies this test, then the tracking basket is complete and can be purchased (see step 110). Such an $r^2$ value, as understood by those of skill in the art, indicates a minimal tracking risk for a tracking basket selected with regard to multiple criteria including absolute volatility tracking ability to a benchmark index, and evidence of no "substantial identity" to the benchmark index. The resulting tracking basket defines not just the identity of the components of the basket but also the number of shares of each component. However, if the $r^2$ value is not within the prescribed range or above/below a prescribed value, then, at step 260, then the components of the basket are swapped and steps 220–250 repeated (step 270) until risk achieved satisfies the threshold requirements, at which time the process ends at step 280. The resulting basket thus strikes a balance between acceptable tracking risk and maximized dispersion.

While volatility can be a basis for selecting a particular component for the tracking basket, it need not be the sole basis for building a tracking basket. Note that a predetermined or minimum volatility difference can be the basis for selecting a component for the tracking basket as long as the degree of correlation of the tracking basket to the underlying index is within a prescribed range, and preferably only alters the $r^2$ by a small amount.

Figure 3:
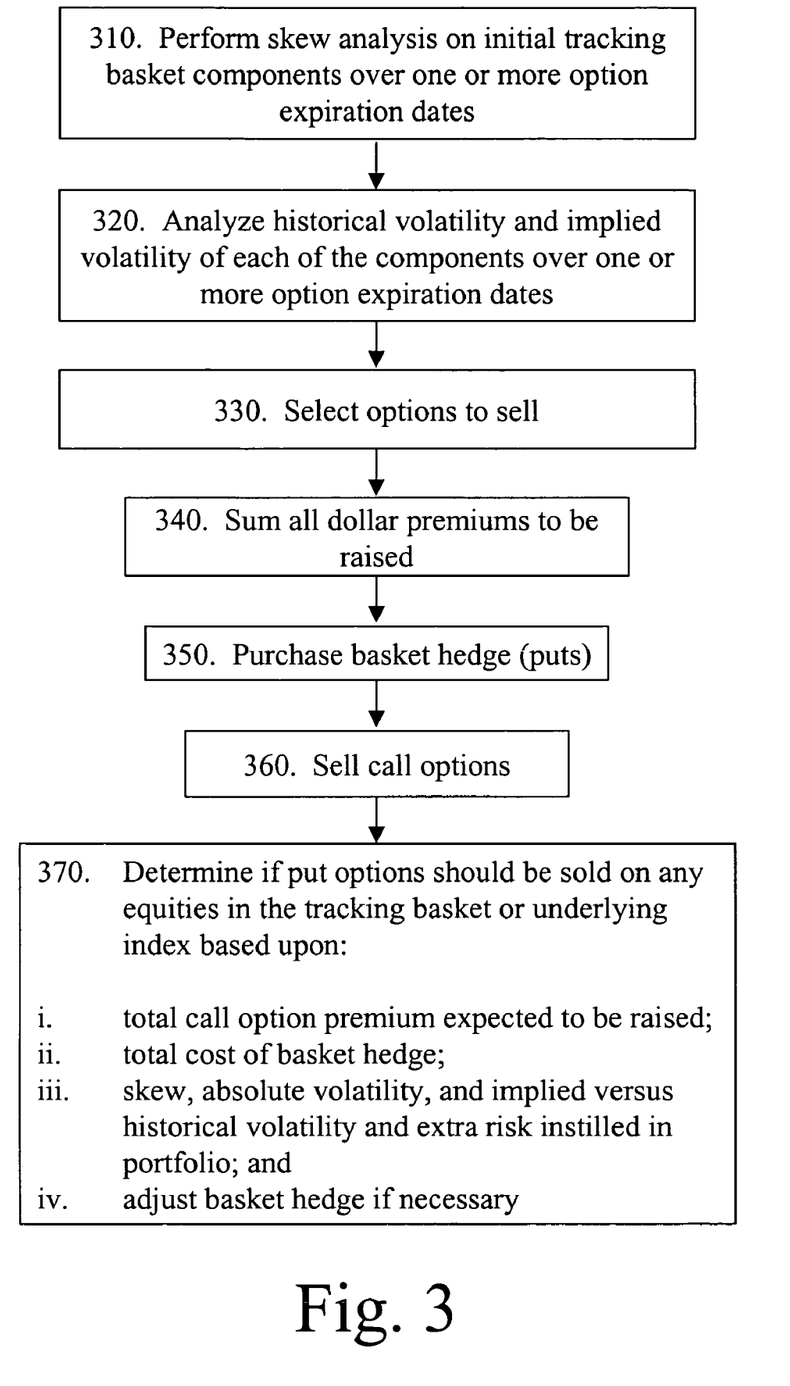
FIG. 3 illustrates a portion of a process for hedging the tracking basket produced by the process flow of FIG. 2, including the steps for raising premiums.
Figure 4:
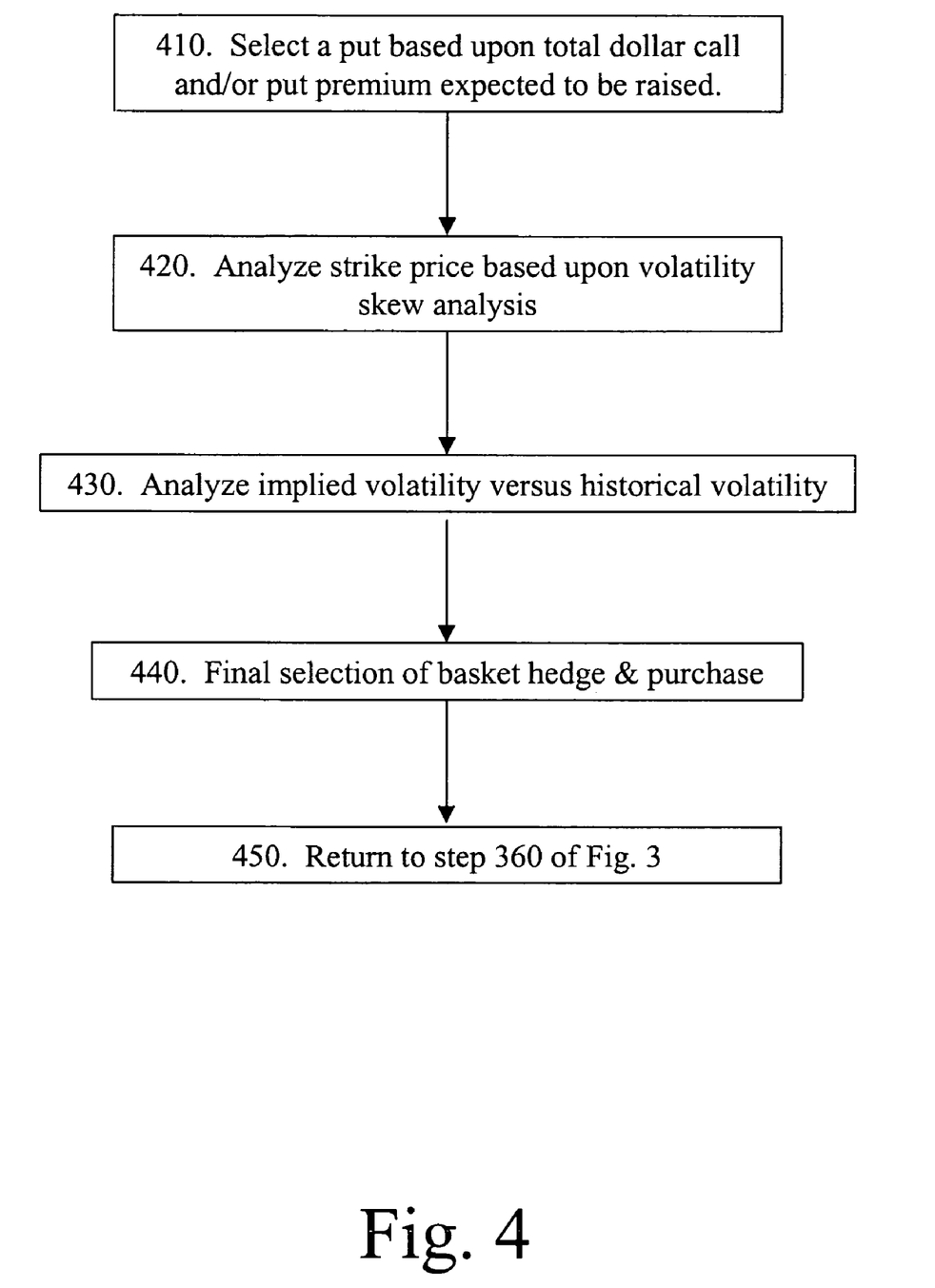
FIG. 4 illustrates another portion of the process for hedging the tracking basket, including the steps which result in a long put against the tracking basket.

FIGS. 3 and 4 outline a process for hedging the tracking basket in accordance with predetermined criteria. In the following discussion, a generally risk neutral portfolio is achieved through a combination of going long on the tracking basket itself and short on the tracking basket components through option purchases and sales.

With reference now to FIG. 3, a method for determining the quantity to purchase, maturity date and strike price of call and put options to sell against the individual securities in the tracking basket is described. At step 310, a skew analysis is performed on a selected number (e.g. all) of the securities in the tracking basket for one or more maturity periods to identify options that are most suitable for raising premium to fund the basket hedge. As understood by those of skill in the art, the skew analysis graphically displays the relationship of implied volatility percentage to strike price, and informs the selection decision among the available options in a given maturity period. The farther out of the money a call option is, for example, the greater its volatility and the lower its premium when sold. A skew analysis can be obtained, for example, using the Bloomberg Reporting Service, available from Bloomberg, LLP. of New York, N.Y., by entering the "skew" command for a given stock. The higher the implied volatility of an identified option, the more relative premium can be collected by shorting the tracking position using such option (regardless of whether it is a call or a put).

At step 320, the historical implied volatility and implied volatility of each of the components in the tracking basket is analyzed. The goal of the analysis of step 320 is to identify those options which have an implied volatility which is greater than the historical volatility of that security, if possible. This analysis is not strike price or maturity date specific, but rather provides a holistic gauge on the "relative" implied volatility of the options associated with the equity under consideration. Historical implied volatility curves are commercially available from services such as the Bloomberg Reporting Service by entering the command "HIVG" for a given security. If an option cannot be found which has an implied volatility greater than its historical volatility for a given maturity period, then the criterion of step 320 might be satisfied by turning to a different maturity period. If an option with suitable volatility cannot be found, then a call or put can be sold on a different component of the tracking basket. To garner the premium necessary to hedge the tracking basket, a call or put may nevertheless be sold based on other criteria, such as if a particular security is trading at a very high implied volatilities.

Of course, the premium that can be collected by shorting a given security in the tracking basket can be maximized through the selection of the strike price (e.g., a lower strike price for a call commands a greater premium than a higher strike price); however, in the method in accordance with the preferred embodiment of the invention, the selection of options to be sold includes a balancing of the implied volatility percentage identified from the skew analysis (and the relative premium that can be raised) against the relative implied volatilities of the options that are available at a variety of different strike prices. In substantially every case, such balancing will result in a higher premium being collected than the skew analysis by itself would identify.

Thus, at step 330, the options which satisfy the predetermined criteria of steps 310 and 320 are selected, resulting in a selection of options. At step 340, the sum total of all dollar premiums anticipated from the sale of such options is determined. At step 350, a hedge against downward market movement is established for the tracking basket (a "basket hedge") by purchasing a put on the benchmark index, as described below with reference to FIG. 4. Preferably after the basket hedge has been established, the call options are sold at step 360 to raise premium to cover and preferably exceed the cost of the basket hedge.

Optionally, at step 370 additional premium can be raised by selling put options on any of the equities that may or may not be in the tracking basket, either before or after selling the call options at step 360. A determination as to whether to raise additional premium by selling puts includes an examination of the premium anticipated to be collected from selling calls against the tracking basket, the actual cost for the basket hedge, the extra risk instilled in the portfolio, and a skew analysis and comparisons of historical and implied volatilities, as described above. In the event that a put is sold, the notional value of the hedge is preferably increased (because the sale of a put option is equivalent to a new, larger long position in the tracking basket which increases the downside risk that is to be hedged).

FIG. 4 shows a process flow for purchasing put options on the benchmark index. The put option is purchased to protect the tracking basket and any short put options that may have been sold, which together define the notional amount of the portfolio, against the risk of a downward turn of the stock market. At step 410, a put is tentatively selected to cover the notional amount of the portfolio based upon the total dollar call and put premium that is expected to be raised as a result of step 340 and, optionally, step 370. The strike price and maturity date of the selected put must bring the net delta of the portfolio (including the equities in the tracking basket, and short calls or puts on those equities, and the proposed long put on the benchmark index) below a threshold value. Preferably, the net delta is minimized, but the value or range for the net delta of the portfolio will vary depending upon the level of acceptable risk in the selected strategy.

As understood by those of skill in the art, "delta" is a measure of the rate of change of an option's value relative to the change in the price of the underlying security.

The minimized net delta for the portfolio can result in a generally risk neutral portfolio when viewed at a given moment. However, in accordance with the inventive method of the preferred embodiment, profits can be had from a generally risk-neutral portfolio with the expiration of the short calls (and short puts, if any) or repurchase of decayed value short calls (and short puts) because a profit results from each options transaction wherein a hedge is purchased for the tracking basket for less than the cost of the premiums collected from selling the more volatile calls (and optionally puts). Such dispersion increases the value of the portfolio over time, particularly in view of the fact that the options are most typically out of the money when sold and so they decay to zero or their intrinsic value, if later in the money, over time. Consequently, money is made in the preferred embodiment by extracting the volatility differential or dispersion between the volatility of the benchmark index and the volatility of the tracking basket.

Once a tentative put has been identified at step 410, its delta is known and the net delta can be determined readily because the short calls and puts identified at steps 340 and 370 also have known deltas. (The delta of each equity in the tracking basket is, by definition, unity). A final selection of a long put to hedge the tracking basket is preferably informed by a skew analysis, performed at step 420, and a comparison of implied volatility to historical (implied) volatility, performed at step 430. In the preferred embodiment, a final put selection is made to hedge the tracking basket and the put is purchased, at step 440, once the foregoing prescribed criteria are satisfied. The process flow then returns to step 360 of FIG. 3, as indicated at step 450.

As can be appreciated by those of skill in the art, each of the foregoing steps can be implemented in an automated machine programmed with the appropriate criteria to perform the analysis and make the selections and trading decisions called for in the foregoing steps. In addition, any of the foregoing steps can be altered or overridden in view of overarching factors such as news events, analyst statements, or other externalities that an experienced trader might which to consider. These overarching factors can be accommodated by an automated system, if desired, through an appropriate rule base which is configured to respond to stored knowledge and real-time data feeds (new knowledge) by re-evaluating the dispersion of the tracking basket (see steps 160 of FIG. 1 and point A in FIG. 2) and taking any action mandated by the rule base or the fund manager.

Whenever one of the options expires or is soon to expire, or the price of the underlying index or a component in the tracking basket changes by a prescribed amount, or there has been a change in the volatility of the underlying index or a tracking basket component, the tracking basket can be re-optimized. The tracking basket is re-optimized by performing the steps after point A of FIG. 2. In addition, the hedging steps of FIGS. 3 and 4 can be performed again, in whole or part, to raise additional premium or update the long put against the tracking basket in accordance with any changes in price or volatility. These steps can be done systematically or idiosyncratically, under control of the fund manager or a rule base in a programmed machine. For example, the changes in price or volatility can be gauged to a price maintained in a knowledge base or data store and used by a rule base to make a determination as to whether a change in the notional amount or volatility warrants a change in the hedge.

A system in accordance with a preferred embodiment of the invention includes a machine such as a network server, personal computer, personal digital assistant, or a Web-compliant device having a software program executing thereon. The software program interacts with the CPU of the machine to provide on a display information to a user sufficient to guide or report the results of the dynamic hedging strategy used to actively manage a portfolio. The program includes a series of instructions which govern the CPU and implement the processes of FIGS. 1–4. The program can include a rule base which describes a system response to changes in price, volatility or overarching conditions (e.g., interest rate) that may be encountered from time to time. The rule base preferably accesses a knowledge base which contains values or criteria consistent with the trading strategy to be implemented in a given fund. These values include reference points for responding to changes. Thus, if a price moves beyond the value specified in the knowledge base, the software can automatically respond by rolling or trading options, if that is what the applicable rule requires for the given fund management strategy, to adjust the hedge dynamically in response to such a change. Likewise, the knowledge base provides objective criteria for responding to changes in volatility or other external factors.

Although the invention has been described in detail in the foregoing preferred embodiment, it is to be understood that such description has been provided for purposes of illustration only and that other variations both in form and detail can be made thereupon by those skilled in the art without departing from the spirit and scope of the invention, which is defined solely by the recitations in the appended claims and equivalents thereof.

We claim:

1. A method for actively managing an account through volatility arbitrage and harvesting, comprising the steps of:
   (A) establishing a tracking basket containing a plurality of equities, the equities in the tracking basket being included in an underlying index and together possessing:
      1. A correlation to the underlying index within a prescribed range; and
      2. A predetermined volatility differential relative to the underlying index; and
   (B) dynamically hedging the tracking basket using options, the hedging step including the steps of:
   buying put options on the underlying index in an amount sufficient to cover the notional amount of the tracking basket at a cost, and
   selling a selection of call options on a plurality of the equities in the tracking basket to raise premium in an amount greater than the cost of buying the put options.

2. The method as in claim 1, wherein the establishing step comprises executing an optimization routine on a programmed computer against at least one predetermined constraint, the optimization routine compiling the tracking basket to include a set of equities and a quantity of each equity in the set.

3. The method as in claim 2, wherein the at least one predetermined constraint is that a prescribed percentage of the tracking basket consist of equities having a minimum volatility differential relative to the underlying index.

4. The method as in claim 3, wherein all of the equities in the tracking basket have a minimum volatility differential relative to the underlying index.

5. The method as in claim 3, wherein a second predetermined constraint is that the tracking basket be less than a predetermined percentage of the underlying index.

6. The method as in claim 1, wherein the establishing step includes a regression analysis which results in a tracking basket that achieves an $r^2$ value, relative to the underlying index, above a predetermined value, wherein the r2 (r squared) value is a measurement of how closely a portfolio's performance correlates with a performance of the underlying index.

7. The method as in claim 6, wherein the r2 value is 0.8 or higher.

8. The method as in claim 6, wherein the r2 value is maximized.

9. The method as in claim 6, wherein the establishing step further includes swapping equities into and out of the tracking basket and repeating the regression analysis until a tracking basket is identified that achieves the r2 value above the predetermined value.

10. The method as in claim 1, wherein the establishing step results in a tracking basket which includes less than a predetermined percentage of the underlying index.

11. The method as in claim 10, wherein the predetermined percentage is 70%, whereby the tracking basket is not identical to the underlying index.

12. The method as in claim 1, wherein the hedging step is performed in accordance with predetermined criteria.

13. The method of claim 1, including the additional step, prior to the step of buying put options, of selecting the put options so that the net delta of the tracking basket and the selection of options is below a threshold value.

14. The method of claim 1, including the additional step, prior to the step of buying put options, of selecting the put options so that the net delta of the tracking basket and the selection of options is minimized.

15. The method as in claim 1, wherein the hedging step comprises buying put options on a plurality of the equities in the tracking basket and selling call options on a plurality of the equities in the tracking basket.

16. A method for actively managing an account through volatility arbitrage and harvesting, comprising the steps of:
   (A) establishing a tracking basket containing a plurality of equities, the equities in the tracking basket being included in an underlying index and together possessing:
      1. A correlation to the underlying index within a prescribed range; and
      2. A predetermined volatility differential relative to the underlying index; and
   (B) dynamically hedging the tracking basket using options, the hedging step including the steps of:
      1. performing a skew analysis on at least a portion of the equities in the tracking basket over one or more maturity periods to identify a first set of options each commanding a premium;
      2. identifying a second set of options each of which has a relative implied volatility which is greater than its historical volatility in a given maturity period;
      3. balancing the implied volatility percentage of the options in the first set against the relative implied volatilities of the options in the second set to identify a selection of options to sell;
      4. selling the selection of options to raise a premium; and
      5. purchasing a long put against the underlying index for an amount which is not substantially greater than the premium raised.

17. The method of claim 16, including the additional step, prior to the step of purchasing the long put, of selecting the long put so that the net delta of the portfolio is below a threshold value.

18. The method of claim 16, including the additional step, prior to the step of purchasing the long put, of selecting the long put so that the net delta of the portfolio is minimized.

19. The method of claim 1, wherein the step of dynamically hedging the tracking basket comprises a re-assessment of the dispersion of the tracking basket.

20. The method of claim 19, wherein the reassessment occurs periodically.

21. The method of claim 19, wherein the re-assessment occurs in response to prescribed events.

22. The method of claim 19, wherein the re-assessment of the dispersion of the tracking basket comprises one or more of the following: rolling the hedge into a later maturity period, trading at least a portion of the hedge, and permitting at least a portion of the hedge to expire.

23. The method of claim 22, wherein the re-assessment is performed in accordance with predetermined criteria.

24. The method of claim 22, wherein the re-assessment includes:
1. performing a skew analysis on at least a portion of the equities in the tracking basket over one or more maturity periods to identify a first set of options each commanding a premium;
2. identifying a second set of options each of which has a relative implied volatility which is greater than its historical volatility in a given maturity period;
3. balancing the implied volatility percentage of the options in the first set against the relative implied volatilities of the options in the second set to identify a selection of options to sell;
4. buying put options on the underlying index in an amount sufficient to cover at least the notional amount of the equities in the tracking basket; and
5. selling the selection of options to raise premium in an amount greater than the cost of the put options bought in the buying step.

25. A software program contained on a computer-readable medium which, when executed within a digital computer, causes the computer to:
 a) access current price information on a designated underlying index, and each of the equities in a tracking basket established in accordance with prescribed criteria;
 b) perform a skew analysis on at least a portion of the equities in the tracking basket over one or more maturity periods to identify a first set of options each commanding a premium;
 c) identify a second set of options each of which has a relative implied volatility which is greater than its historical volatility in a given maturity period;
 d) balance the implied volatility percentage of the options in the first set against the relative implied volatilities of the options in the second set to identify a selection of options to sell;
 e) identifying one or more put options which, together with the selection of options to sell, results in a net delta of a portfolio which includes the tracking basket, the selection of options to sell, and the identified put options which is below a threshold value; and
 f) display on a monitor connected to the computer the selection of options to sell and the identified put options, whereby the software program automatically identifies a generally risk neutral portfolio.

\* \* \* \* \*